H. F. M. PODEYN.
SHAFT PROTECTOR.
APPLICATION FILED OCT. 28, 1909.
1,012,909.
Patented Dec. 26, 1911.
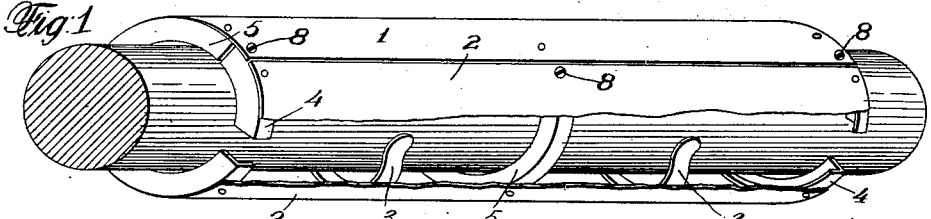
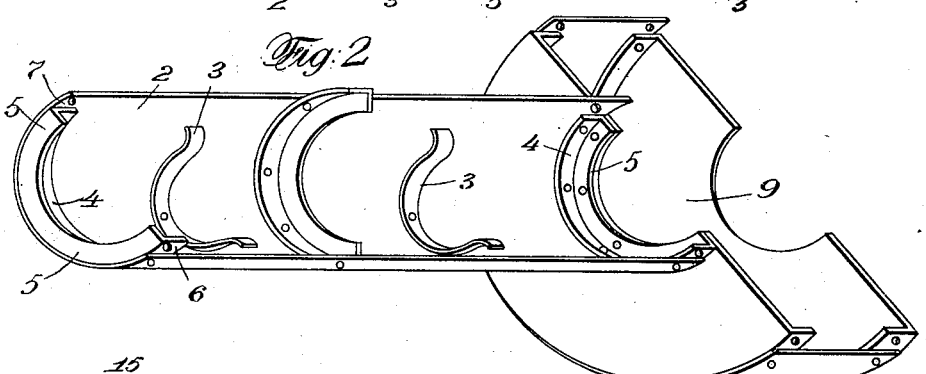
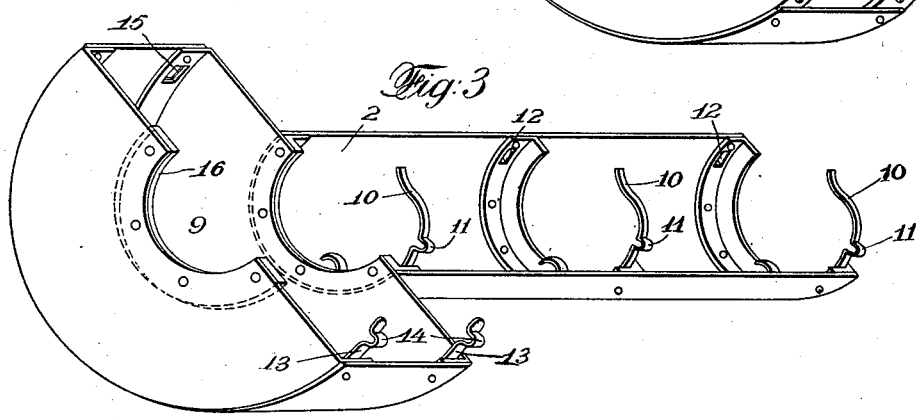
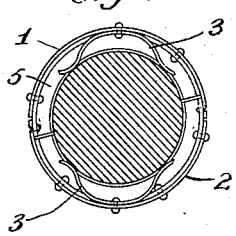
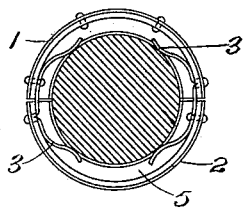
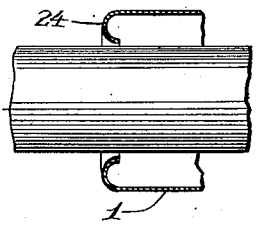
Witnesses:
Philip S. McLean
Teresa P. Lynch
Inventor
Henry F. M. Podeyn
By his Attorneys
Brock Becker & Smith
COLUMBIA PLANOGRAPH CO., WASHINGTON, D. C.

UNITED STATES PATENT OFFICE.

HENRY F. M. PODEYN, OF BROOKLYN, NEW YORK, ASSIGNOR TO SAFETY POWER TRANSMISSION COMPANY, A CORPORATION OF NEW YORK.

SHAFT-PROTECTOR.

1,012,909.  Specification of Letters Patent.  Patented Dec. 26, 1911.

Application filed October 28, 1909. Serial No. 525,043.

*To all whom it may concern:*

Be it known that I, HENRY F. M. PODEYN, a citizen of the United States, and a resident of Brooklyn, in the county of Kings and State of New York, have invented certain new and useful Improvements in Shaft-Protectors, of which the following is a specification.

My invention relates to improvements in shaft protectors, and is in the nature of an improvement of the one shown in my Patent No. 600,375, issued to me March 8, 1898.

In the patent referred to, there is shown a casing for inclosing the shaft and this casing is revolubly supported upon the shaft by means of springs which normally serve to hold the body of the casing out of contact with the shaft. The casing is thus caused to normally rotate with the shaft, but as soon as any weight is placed upon the casing, as by a relatively stationary object coming in contact therewith, the casing ceases to revolve, while permitting the shaft to revolve freely therein. I find with the form of the device shown in the patent that when any great weight is applied to the protective casing, there is a tendency for the springs to become flattened out and to lose their elasticity to a certain extent, thereby rendering them unable to return the casing to the original position out of contact with the shaft. Also when the springs were thus weakened in any way, there is a tendency for the casing to rattle upon the shaft. It is desirable that the casing be supported out of contact with the shaft at all times so that the shaft may revolve absolutely free within the casing, no matter how much weight or pressure is applied to the casing.

It is one of the objects of my present invention to support the protective casing entirely out of contact with the shaft, no matter how great the pressure may be upon the casing.

Another object of the invention is to make the casing as light as possible and yet to brace it in such a way as to render it capable of withstanding all shocks and strains to which it may be subjected.

In its preferred form the invention consists of a comparatively light sheet metal casing which is provided with a number of strengthening rings, which rings have a larger internal diameter than that of the shaft, and there are also provided springs for engaging the shaft to support the body of the casing out of contact therewith and the said springs are adapted to normally hold the strengthening rings out of contact with the shaft.

For convenience in applying the casing to the shafting and removing it therefrom, it is preferably made in longitudinal sections. Another feature of my invention resides in improved means for securing the sections of the casing together.

In the accompanying drawings are illustrated several preferred embodiments of the invention but it will be understood that various changes may be made therein without departing from the spirit and scope of the invention.

In the drawings: Figure 1 is a perspective view of my improved shaft protector as applied to a section of shafting. For purposes of illustration several parts have been broken away. Fig. 2 is a perspective view of a longitudinal section of the casing as provided with an enlargement for inclosing a coupling or other part. Fig. 3 is a like view illustrating a modification in the form of the means for securing the sections together. Fig. 4 is a cross-sectional view of that form of the invention shown in Fig. 1. Fig. 5 is a cross-sectional view of the form of the invention illustrated in Fig. 3, as applied to a shaft. Fig. 6 is a detail view showing a modified form of strengthening member. Fig. 7 is a broken sectional view illustrating the manner in which a casing of uniform diameter may be utilized for protecting a shaft of a variable size.

Like reference characters denote like parts throughout the several views.

The body of the protective casing is preferably made of sheet metal and for convenience of application to and removal from the shafting it is preferably made in longitudinal sections 1—2. These sections are preferably made in halves, semi-circular in shape, as shown. The casing is supported out of contact with the shaft preferably by means of springs 3, secured to or forming an integral part of the casing, and these springs have their ends resting upon the shaft so as to support the casing out of contact therewith. The springs may, if desired, be carried by the rings, and the claims are to be construed accordingly. It is desirable that this casing be made of as light material as possible and in order to secure the necessary rigidity I therefore employ one or a number of annular strengthening members 4. These strengthening members are affixed preferably to the ends of the casing, as shown in Fig. 1, and one or more of these members may be disposed at points intermediate the ends of the casing, according as required.

It will be obvious that instead of making the annular strengthening members separate from the casing, they could very well be formed integral with the casing at the time of manufacture. Thus, the ends of the casing could be made in the form of inturned rims or flanges 24, as shown in Fig. 6, which would then serve as strengthening members. The internal diameter of these annular members is sufficiently great to afford a clearance for the shaft. The springs are sufficiently strong to normally hold the casing out of contact with the shaft, but if any great weight should be thrown upon the casing, the inwardly directed rim portion 5, of the annular members, would engage the shaft and thus support the body of the casing away from the shaft. I prefer also to utilize these annular members as a means for securing the sections of the casing together. For this reason the annular members would be preferably made of the same semi-circular shape as the portions of the casing, but would be circumferentially displaced therefrom, as shown in Figs. 1, 2 and 4, so that the end portion 6, thereof, will project beyond the edge of the section and beneath the edge of the abutting section. This displacement of the so-called annular strengthening members provides a space 7, beneath the edge of the section for the projecting end of the member on the opposite section. These strengthening members may be arranged with their projecting ends in alternate order, as shown in Fig. 2, so as to provide a more secure joint between the abutting sections. Screws or other fastenings 8 would be passed through the edges of the sections and into the overlapping ends of the annular members for securing the parts together. The sectional casing illustrated in Fig. 2 is shown as provided with an enlargement 9, adapted for inclosing a collar or other device on the shaft. The casing would of course be provided with enlargements wherever necessary, and of any required shape, so as to inclose couplings, set-screws and other projecting parts on the shaft.

In that form of the invention shown in Figs. 3 and 5, the springs 10, which support the casing upon the shaft, project beyond the edge of the sections to which they are secured and the projecting portions of the springs each carry a locking lug or member 11, which members make engagement with seats 12, on the corresponding edge of the abutting section. By this means there is provided a spring-lock which permits of the casing being readily applied and removed. The locking projections on the springs may be provided by making an angular bend in the body of the spring, as shown. In this case the spring would preferably be secured direct to the strengthening members and the seats for the locking projections would preferably be formed right in the strengthening members, in the manner illustrated.

That form illustrated in Fig. 3 is also shown as provided with an enlargement for the reception of a projecting part on the shaft. The enlarged portion of the casing would preferably be provided with locking means also, and this might take the form of the spring members 13, having the locking projections 14 for engagement with corresponding seats 15, near the abutting edge of the opposite section of the casing. Also I find it advisable to provide the enlargement with the reinforcing strip 16, surrounding the opening for the passage of the shaft therethrough, to take up any wear occasioned by the casing coming into contact with the shaft.

By the use of the so-called strengthening members I am enabled to make the casing of comparatively light sheet material, since these strengthening members give to the casing the necessary strength and rigidity. And these strengthening members also serve to prevent injury and distortion of the supporting springs, since when any great weight is placed upon the protector, the springs first yield to the limit of their elasticity and then the strengthening members come in contact with the shaft. The annular members on the ends of the casing also provide a smooth contact surface on the abutting ends of the different sections of the casing, so that the different lengths of the casing may rotate independently of each other without any undue friction therebetween.

It sometimes happens that the shaft is of variable diameter and in order to protect a shaft of this character I find it better to make the casing of a uniform diameter and of sufficient size to inclose all portions of the shaft. In such a case as this the strengthening rings would all be made of the same external diameter but the openings therein for the passage of the shaft would vary according as to the diameter of the shaft, so as to just leave sufficient clearance for the shaft. Such a construction as this is illustrated in Fig. 7. Here it will be noted the casing is of the same uniform diameter but the internal diameter of the rings varies in accordance with the diameter of the shaft. In the same way a protective casing of a certain outside diameter may be utilized for protecting different sizes of shafting. The only difference in each case being that the internal diameter of the ring would be greater or less to allow sufficient clearance for the different sizes of shafting, while the outside diameter of the casing remains the same. This obviates the necessity for keeping a number of different sizes of rings on hand, since rings of the same external diameter may be used on different sizes of shafting, by punching the rings of an internal diameter to correspond to that of the shaft for which it is intended.

I claim—

1. A shaft protector comprising a casing made in longitudinal sections, internal strengthening rings carried by the casing, and springs carried by each of the sections having parts to interlock with the opposite section for securing said sections together, and said springs having portions resting upon the shaft to normally support the strengthening rings out of contact with the shaft.

2. A shaft protector comprising a casing made in longitudinal sections, and means for securing the sections of the casing together, said means having portions to engage the shaft and support the body of the casing out of contact therewith.

Signed at Brooklyn in the county of Kings and State of New York this 23rd day of October A. D. 1909.

HENRY F. M. PODEYN.

Witnesses:
PHILIP BROWN,
T. W. FARNHAM.

Copies of this patent may be obtained for five cents each, by addressing the "Commissioner of Patents, Washington, D. C."